Sept. 20, 1932.  L. M. WOOLSON  1,878,566
INTERNAL COMBUSTION ENGINE
Filed Feb. 1, 1929
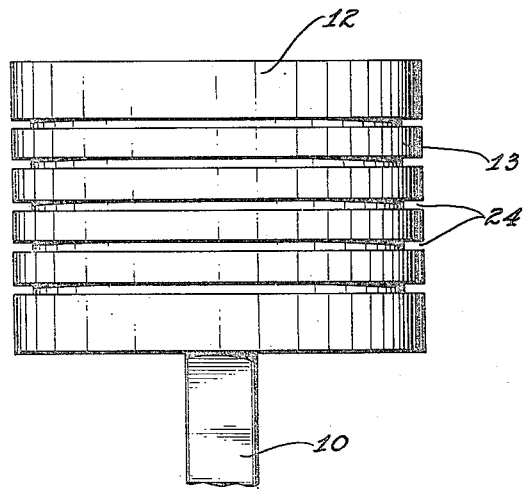
Fig. 1
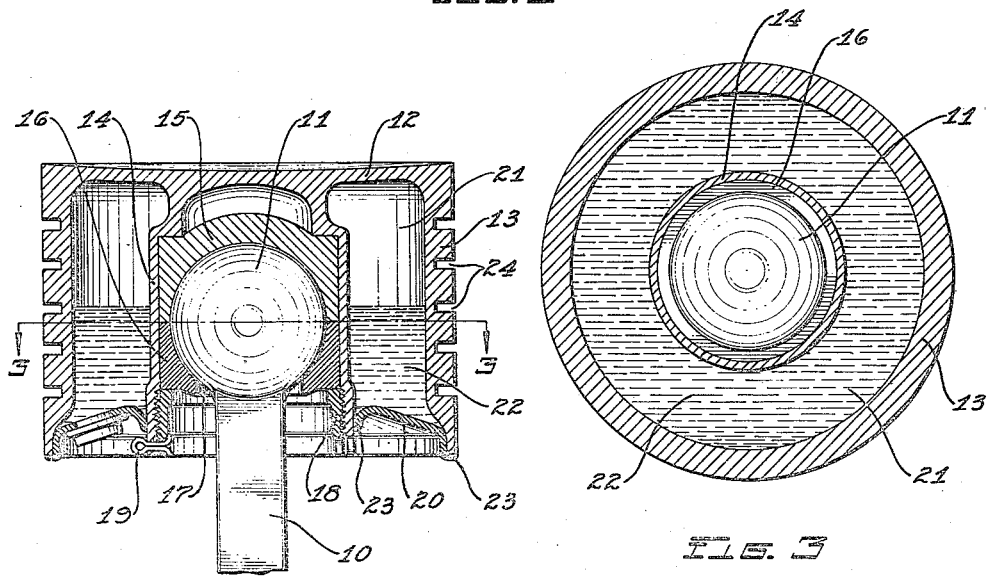
Fig. 2
Fig. 3
Inventor
LIONEL M. WOOLSON.
By Milton Tibbetts
Attorney Patented Sept. 20, 1932

1,878,566

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed February 1, 1929. Serial No. 336,900.

This invention relates to internal combustion engines and more particularly to pistons.

An object of the invention is to provide a new and novel form of engine piston which is capable of withstanding high temperatures without distortion or burning.

Another object of the invention is to provide a novel form of piston structure in which heat is absorbed from the walls by a contained cooling medium.

A further object of my invention is to provide a thin, light, metal piston which is rugged and capable of withstanding a high combustion temperature and pressure.

Other objects of the invention will appear from the following description taken in connection with the drawing, which forms a part of this specification, and in which:

Fig. 1 is a side elevation of a piston construction incorporating my invention;

Fig. 2 is a medial, vertical, sectional view of the same, and

Fig. 3 is a sectional view of the piston taken on line 3—3 of Fig. 2.

In the drawing, 10 represents a piston connecting rod having an end 11 formed integrally therewith and in the shape of a ball. This type of rod is provided so that the use of the customary pin extending through apertured bosses in the skirt will not be necessary, and thereby the necessity of allowing a definite length between the head and the connecting rod pin for the reception of piston rings is eliminated so that a relatively short skirt can be used.

Associated with the connecting rod 10 is a piston having a head 12 and a relatively short skirt 13 depending from the head. A hollow boss 14 depends centrally from the inner wall surface of the piston head, such boss is formed integral with the head and is arranged in spaced parallel relation with the interior surface of the skirt. The piston is preferably formed as a steel forging so that the integral head, skirt and boss can be formed with relatively thin walls capable of withstanding high pressure and temperature without pitting or distortion.

A two part bearing, consisting of an upper section 15 and a lower section 16 both preferably formed of bronze, is removably seated in the depending boss 14. The adjacent faces of the bearing sections are formed substantially semi-spherical in shape to receive and provide a bearing for the ball end 11 of the connecting rod. The lower bearing section is of the conventional split type provided with an aperture 17 so that the rod can be inserted therethrough before assembly with the piston and to permit oscillation of the rod relative thereto during operation of the engine.

The wall forming the open end of the boss is threaded interiorly to receive the open retaining ring 18 which is screwed into the boss tightly against the lower bearing member. Locking means for the retaining ring is provided and is in the form of a cotter pin 19 which extends through the wall of the boss adjacent the nut. The pin and retaining ring are removable from the boss, and likewise are the bearing and connecting rod.

A reinforcing wall member 20 extends between the end of the skirt and the end of the boss, such member also serving as a closure for a chamber 21 which is adapted to be partially filled with a heat-absorbing substance 22, such as lithium potassium, for abstracting heat from the head and the rod bearing, said substance taking a liquid form under engine operating temperature. The member 20 is bent at its edges to extend in a plane substantially parallel with the boss and the skirt, and such bent portions are preferably permanently welded at 23 annularly to the adjacent portions of the boss and skirt. The chamber 21 is formed by the inner surface of the skirt, head and closure wall, and the outer surface of the boss.

The piston above described can be formed as a lightweight, short, hollow structure having thin walls which will reduce the weight of an engine with which it is associated.

By the provision of the depending boss for securing the connecting rod interiorly of the skirt, no special length of skirt is required adjacent the head for the reception of rings, and therefore, the ring recesses 24 can be arranged in any plane on the skirt and consequently in a plane with the secured end of the connecting rod if desired. This construction allows a piston to be formed with a relatively short skirt which will decrease the height of an upright engine and doubly so of a radial engine. Such short pistons in airplane engines will, therefore, materially lessen the air resistance and permit increased speed development. In addition, the short skirt and the hollow construction of the piston will assist in the reduction of engine weight, which is also highly advantageous with airplane engines. Furthermore, the piston elements can be readily machined, which is an important factor in reducing cost.

It will be understood that various forms of the invention other than that described above may be used without departing from the spirit or scope of the invention.

What I claim is:

1. A piston comprising a head, a skirt, a hollow boss coextensive with the skirt, said head, skirt and boss being formed integrally, an applied wall for closing the space between the open ends of the skirt and the boss, said applied wall having flanges bent to extend parallel with the skirt and the boss, means for permanently securing the flanges to the skirt and to the boss in leak proof relation, and a heat absorbing medium intermediate the boss and the skirt.

2. A piston comprising a head, a skirt, a hollow boss coextensive with the skirt, said head, skirt and boss being formed as an integral unit, an applied wall telescoping within the space between the open ends of the skirt and the boss, means for permanently securing the telescoping wall in leaf proof relation with the skirt and the boss, and a heat absorbing medium intermediate the skirt and the boss.

3. A cast piston comprising a head portion, a skirt portion extending from the head portion, a cylindrical boss extending from the head portion within and parallel to the skirt portion, a separately formed thin closure wall extending between and permanently secured to the extended skirt portion and the boss, and a heat absorbing medium within the interior of the piston.

4. A rigid piston comprising a head portion, a skirt portion extending from the head portion, a cylindrical hollow boss extending from the head portion within the skirt portion and parallel therewith, a separately formed and applied thin wall extending between and permanently secured to the ends of the boss and the skirt portion remote from the head portion, and a heat absorbing medium within the interior of the piston.

In testimony whereof I affix my signature.

LIONEL M. WOOLSON.